Sept. 16, 1941. M. SPENCER 2,255,830
IDENTIFICATION TAG
Filed May 5, 1941
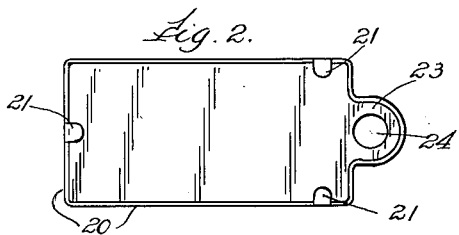
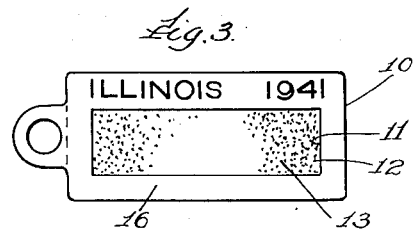
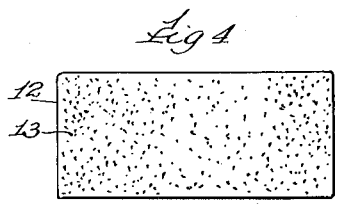
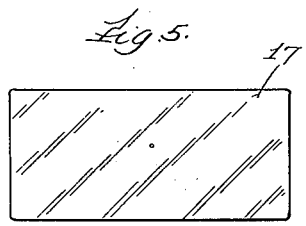
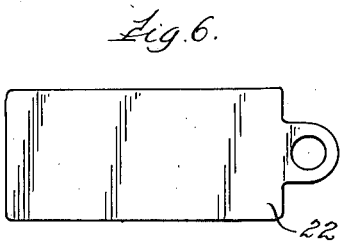
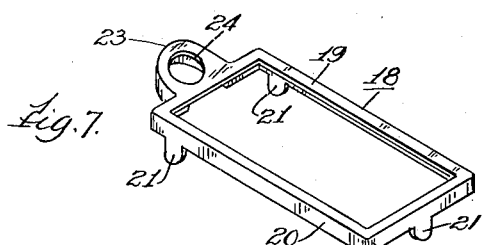
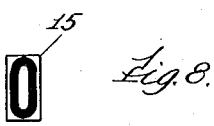
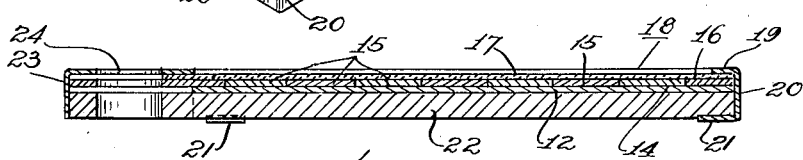
Inventor
Milton Spencer
by James R. McKnight
his Attorney Patented Sept. 16, 1941

2,255,830

UNITED STATES PATENT OFFICE 2,255,830

IDENTIFICATION TAG

Milton Spencer, Chicago, Ill., assignor to Max Bressler, Chicago, Ill.

Application May 5, 1941, Serial No. 391,890

1 Claim. (Cl. 40—140)

My invention relates to an identification tag and to a method of making the same.

It is among the objects of my invention to provide an identification tag which may be economically made and which will be lasting in wear and attractive in appearance, and a method of making the same, and such other objects, advantages and capabilities as will later more fully appear and which are inherently possessed by my invention.

While I have shown herein a preferred embodiment and method of my invention, yet I wish it understood that the same are susceptible of modification and change without departing from the spirit of my invention.

Referring to the drawing, Fig. 1 is a front elevational view of my identification tag, and Fig. 2 is a rear elevational view of the same; Fig. 3 is a front elevational view of the plate and tape; Fig. 4 is a plan view of the adhesive face of the tape; Fig. 5 is a plan view of the transparent member; Fig. 6 is a plan view of the filler; Fig. 7 is a perspective view of the frame; Fig. 8 is a plan view of a segment bearing a symbol, and Fig. 9 is an enlarged sectional view on line 9—9 of Fig. 1.

The embodiment selected to illustrate my invention comprises a plate or other flat body member 10 having an aperture 11 therein. A tape 12 is attached to said plate 10, with the adhesive face 13 of the tape adhering to the back 14 of the plate 10.

A plurality of segments 15 are positioned within the aperture 11 of the plate 10 with their backs adhering to the face 13 of the tape 12. The segments 15 are each of a length adapted to fill the length of the aperture, and the total of the segments are of such a width as to fill the width of the aperture 11. There of course may be variations of the above description of the width and length of the segments, it being within the contemplation of my invention that a known number of segments 15 fills aperture 11. When the desired number of segments is within the aperture to fill the same, the edges of the segments contact adjacent segments within the aperture. At least one or more of the segments 15 may bear numbers, letters or other symbols or indicia. The face 16 of the plate 10 may also bear desirable indicia. For instance in the form illustrated "Illinois 1941" appears on the face 16 of the plate 10 and "522053" appears on the segments 15.

A transparent member 17 of Celluloid or the like is positioned over the face 16 of plate 10 and the segments 15.

A frame 18 has a face portion 19 and integrally drawn right angle flanges 20 with a plurality of spaced bendable clip portions 21. The plate 10 with its transparent covering 17 is positioned within the frame 18 with the inner surfaces of the face portion of the frame bearing against the upper face portion of the transparent member 17. The flanges 20 prevent accidental displacement of the plate 10. A filler 22 is positioned within said frame 10 against the back portion of said tape 12. The clips 21 are bent against the filler 22 to hold the identification tag in completed position. My frame 18 may have an extension 23 with an opening 24 therein to receive a key chain or other suitable object.

Referring now to my method of making an identification tag, I form a plate or body member 10 with a suitable aperture 11. I then apply the adhesive face 13 of a tape 12 to the back 14 of the plate 10.

My next step is to place a plurality of segments 15 bearing symbols or plain, as desired, within aperture 11 of plate 10 to fill said aperture, with the backs of the segments adhering to the adhesive face 13 of the tape 12. A transparent covering 17 is placed over the face 16 of the plate 10 and the segments 15, and so covered the plate 10 is placed within a flanged frame 18. A filler 22 is positioned within frame 18 and against the back of tape 12. I then fasten the frame 18 to the filler 22, to complete the finished identification tag.

My identification tags are suitable as miniatures of a user's automobile license, as shown in the drawing, or for his bank deposit number, house number, draft number, or any other number or symbol desirable to have in one's possession. Because each tag has to be made to contain segments bearing symbols desired by the user, each tag is individual. I have found it desirable to furnish the apertured plate 10, the tape 12, a great number of segments 15 containing a variety of markings and some plain for spacers, the transparent member 17, the frame 18 and the filler 22 in a suitable container, with instructions disclosing my method of making the tag. The user following my method can then proceed to make his own tag bearing the symbols he desires. My method if followed by the user insures an attaching unit that has perfectly fitted parts which cannot accidentally fall apart. The finished product protects the segments from wear and the elements so that the symbols remain clean, dustproof and impervious to wear.

It is also possible for a user to remove the segments and substitute other segments as he desires from time to time.

Having thus described my invention, I claim:

An identification tag comprising a flat thin plate having an aperture therein, a tape of the same size as said plate, said tape having an adhesive face, the adhesive face of said tape attached to and covering all of the back of said plate, a plurality of flat, thin segments within the aperture of said plate with the backs of said segments adhering to the adhesive face of said tape, said segments of such a size that the total of said segments fills the aperture of said plate, at least some of said segments bearing symbols, a transparent covering over the face of said plate and said segments, a frame surrounding said transparent covering, said frame having flanged edges and bendable clips, a filler contacting the back of said tape and within the flanged edges of said frame, said bendable clips bent against the back of said filler to prevent accidental displacement of said filler, said plate and said segments from said frame.

MILTON SPENCER.